US009301317B2

(12) United States Patent
Han

(10) Patent No.: US 9,301,317 B2
(45) Date of Patent: Mar. 29, 2016

(54) METHOD AND DEVICE FOR PROCESSING SCHEDULING REQUEST IN HANDOVER SCENARIO

(71) Applicant: ZTE Corporation, Shenzhen (CN)

(72) Inventor: Huben Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/439,509

(22) PCT Filed: Jul. 22, 2013

(86) PCT No.: PCT/CN2013/079774
§ 371 (c)(1),
(2) Date: Apr. 29, 2015

(87) PCT Pub. No.: WO2013/182152
PCT Pub. Date: Dec. 12, 2013

(65) Prior Publication Data

US 2015/0296534 A1 Oct. 15, 2015

(30) Foreign Application Priority Data

Oct. 29, 2012 (CN) .......................... 2012 1 0420786

(51) Int. Cl.
*H04W 72/12* (2009.01)
*H04W 36/00* (2009.01)
*H04W 28/02* (2009.01)

(52) U.S. Cl.
CPC ...... *H04W 72/1284* (2013.01); *H04W 28/0278* (2013.01); *H04W 36/00* (2013.01); *H04W 36/0005* (2013.01)

(58) Field of Classification Search
CPC ...... H04W 72/12; H04W 28/02; H04W 36/00
USPC ........ 455/436, 442, 435.1; 370/228, 331, 380
See application file for complete search history.

(56) References Cited

U.S. PATENT DOCUMENTS 8,913,565 B2 * 12/2014 Ostergaard ........ H04W 72/1284 370/329
2005/0053009 A1 3/2005 Denby et al.
(Continued)

FOREIGN PATENT DOCUMENTS

CN 201063813 Y 5/2008
CN 101370267 A 2/2009
CN 101932052 A 12/2010

OTHER PUBLICATIONS

International Search Report of PCT/CN2013/079774, dated Oct. 24, 2013.

(Continued)

*Primary Examiner* — Michael T Vu
(74) *Attorney, Agent, or Firm* — Banner & Witcoff, Ltd.

(57) ABSTRACT

A method and apparatus for processing a scheduling request in a handover scenario are provided. The method comprises: when user equipment has just handed over to a new cell, setting an advance time interval for triggering a scheduling request in advance according to a number of a subframe for sending a handover completion message of the user equipment; in the advance time interval, determining a trigger time for triggering the scheduling request in advance according to the number of the subframe for sending uplink data of the user equipment; and triggering the scheduling request in advance according to the trigger time. The technical solution is applied to guarantee that uplink FTP data are sent in time through sending a triggered scheduling request in advance, and avoid the occurrence of the FTP flow interruption phenomenon.

10 Claims, 9 Drawing Sheets

Start

When user equipment has just handed over to a new cell, an advance time interval for triggering a scheduling request in advance is set according to the number of the subframe for sending a handover completion message of the user equipment — S10

In the advance time interval, a trigger time for triggering the scheduling request in advance is determined according to the number of the subframe for sending uplink data of the user equipment — S20

The scheduling request is triggered in advance according to the trigger time — S30

End

(56) References Cited

U.S. PATENT DOCUMENTS

2009/0280798 A1 11/2009 Meylan et al.
2010/0098011 A1 4/2010 Pelletier et al.
2013/0191544 A1* 7/2013 Caldeira de Andrada ............... H04L 67/325 709/226
2015/0063278 A1* 3/2015 Ostergaard ........ H04W 72/1284 370/329

OTHER PUBLICATIONS

Supplemental Search Report of European Application No. 13801288, dated Aug. 27, 2015.

* cited by examiner

METHOD AND DEVICE FOR PROCESSING SCHEDULING REQUEST IN HANDOVER SCENARIO

TECHNICAL FIELD

The present document relates to a technology for processing a scheduling request in a handover scenario, and in particular, to a method and apparatus for processing a scheduling request in a handover scenario.

BACKGROUND

Under the LTE mode, when the data transmission of the File Transfer Protocol (FTP) service is performed, under the handover environment that the interference among the cells is relatively large and the receiving quality is relatively poor, the user equipment usually needs to hand over to the new cell to perform the uplink data transmission. Before the handover occurs, the corresponding FTP flowrate will be thereupon reduced since the interference among the cells is increasing gradually, and its sending window is reduced gradually. During the handover, the uplink and downlink data are in the suspending state, the FTP window will be further worsen at this moment, and the resending data will be accumulated in the high-layer buffer. When the user equipment has just handed over to the new cell, because the interference among the cells is still relatively large and the quality of the received signal is also relatively poor, the user equipment is easy to present the situation that the uplink authorization detection is lost or it is failed to send the uplink hybrid automatic repeat request. If the user equipment loses the uplink scheduling for once or twice at this moment, then the user equipment does not trigger the scheduling request in a long time because the conventional buffer status report (BSR) trigger condition cannot be satisfied, and then causing that the uplink FTP data transmission is unable to be performed in a long time, thus causing that the FTP window is blocked for a long time and the FTP connection is disconnected finally.

SUMMARY

The main objective of the embodiment of the present document is to provide a method and apparatus for processing a scheduling request in a handover scenario, which is aimed at guaranteeing that uplink FTP data are sent in time through triggering a scheduling request in advance when the user equipment is just handed over to a new cell, and avoiding the occurrence of an FTP interrupt phenomenon.

In order to solve the above-mentioned technical problem, the following technical scheme is adopted.

A method for processing a scheduling request in a handover scenario comprises:

when user equipment has just handed over to a new cell, setting an advance time interval for triggering a scheduling request in advance according to a number of a subframe for sending a handover completion message of the user equipment;

in the advance time interval, determining a trigger time for triggering the scheduling request in advance according to the number of the subframe for sending uplink data of the user equipment; and triggering the scheduling request in advance according to the trigger time.

Alternatively, the step of setting an advance time interval for triggering a scheduling request in advance according to a number of a subframe for sending a handover completion message of the user equipment comprises:

setting the number of the subframe for sending the handover completion message of the user equipment as a starting time for triggering the scheduling request in advance; and setting a sum of the starting time and a preset retransmission buffer status report timer duration as a termination time of triggering the scheduling request in advance, wherein, an interval between the stating time and the termination time is the advance time interval.

Alternatively, the step of determining a trigger time for triggering the scheduling request in advance according to the number of the subframe for sending uplink data of the user equipment comprises:

setting a sending time required by a maximum value of a number of times of sending hybrid automatic repeat request; and determining a sum of the number of the subframe for sending the uplink data of the user equipment and the sending time as the trigger time for triggering the scheduling request.

Alternatively, the step of triggering the scheduling request in advance according to the trigger time comprises:

after the user equipment sends the uplink data last time, judging whether each subframe obtains an uplink authorization; if yes, then updating the number of the subframe for sending the uplink data of the user equipment, and re-determining the trigger time for triggering the scheduling request in advance according to the updated number of the subframe;

if not, judging whether a number of a current subframe of the user equipment is greater than the trigger time; if yes, then judging whether the buffer status report in the uplink data sent last time is zero or not; and when the buffer status report in the uplink data sent last time is not zero, triggering the scheduling request in advance.

Alternatively, before judging whether the number of the current subframe of the user equipment is greater than the trigger time, the method further comprises:

judging whether the number of the current subframe of the user equipment is greater than the termination time of triggering the scheduling request in advance.

An apparatus for processing a scheduling request in a handover scenario comprises a setting module, a determination module and a trigger module, wherein:

the setting module is configured to: when user equipment has just handed over to a new cell, set an advance time interval for triggering a scheduling request in advance according to a number of a subframe for sending a handover completion message of the user equipment;

the determination module is configured to: in the advance time interval, determine a trigger time for triggering the scheduling request in advance according to the number of the subframe for sending uplink data of the user equipment; and the trigger module is configured to: trigger the scheduling request in advance according to the trigger time.

Alternatively, the setting module comprises a first setting unit and a second setting unit, wherein:

the first setting unit is configured to: set the number of the subframe for sending the handover completion message of the user equipment as a starting time for triggering the scheduling request in advance; and the second setting unit is configured to: set a sum of the starting time and a preset retransmission buffer status report timer duration as a termination time of triggering the scheduling request in advance, wherein, an interval between the stating time and the termination time is the advance time interval.

Alternatively, the determination module comprises a third setting unit and a determination unit, wherein:

the third setting unit is configured to: set a sending time required by a maximum value of a number of times of sending hybrid automatic repeat request; and the determination unit is configured to: determine a sum of the number of the subframe for sending the uplink data of the user equipment and the sending time as the trigger time for triggering the scheduling request.

Alternatively, the trigger module comprises a first judgment unit, an update and determination unit, a second judgment unit, a third judgment unit and a trigger unit, wherein:

the first judgment unit is configured to: after the user equipment sends the uplink data last time, judge whether each subframe obtains an uplink authorization;

the update and determination unit is configured to: update the number of the subframe for sending the uplink data of the user equipment, and re-determine the trigger time for triggering the scheduling request in advance according to the updated number of the subframe;

the second judgment unit is configured to: judge whether a number of a current subframe of the user equipment is greater than the trigger time;

the third judgment unit is configured to: judge whether the buffer status report in the uplink data sent last time is zero or not; and the trigger unit is configured to: when the buffer status report in the uplink data sent last time is not zero, trigger the scheduling request in advance.

Alternatively, the trigger module further comprises a fourth judgment unit, wherein:

the fourth judgment unit is configured to: judge whether the number of the current subframe of the user equipment is greater than the termination time of triggering the scheduling request in advance.

In the above-mentioned technical solution, the advance time interval is set for triggering the scheduling request in advance when the user equipment has just handed over to the new cell, and the trigger time for triggering the scheduling request in advance in the advance time interval is determined according to the number of the subframe for sending the uplink data of the user equipment, and finally the scheduling request is triggeded in advance according to the trigger time, thus guaranteeing that the uplink FTP data are sent in time through sending the scheduling request in advance, and avoiding the occurrence of the FTP flow interruption phenomenon.

The realization of the objective, the function characteristics and the advantages of the present document will be further illustrated by combining with the embodiments and referring to the accompanying drawings.

PREFERRED EMBODIMENTS OF THE PRESENT DOCUMENT

It should be understood that, the embodiments illustrated hereinafter are used to describe and explain the present document, rather than constituting an inappropriate limitation to the present document.

The present document provides a method for processing a scheduling request in a handover scenario, where under the handover environment that the interference among the cells is relatively large and the receiving quality is relatively poor, when the user equipment has handed over to a new cell, a media access control module of the user equipment can apply for the uplink scheduling to the base station in advance according to the uplink transmission situation, thus being able to avoid the occurrence that the FTP flow interruption is caused since the uplink FTP data are not sent out for a long time because the uplink authorization detection is lost or the uplink authorization is not used successfully.

Figure 1:
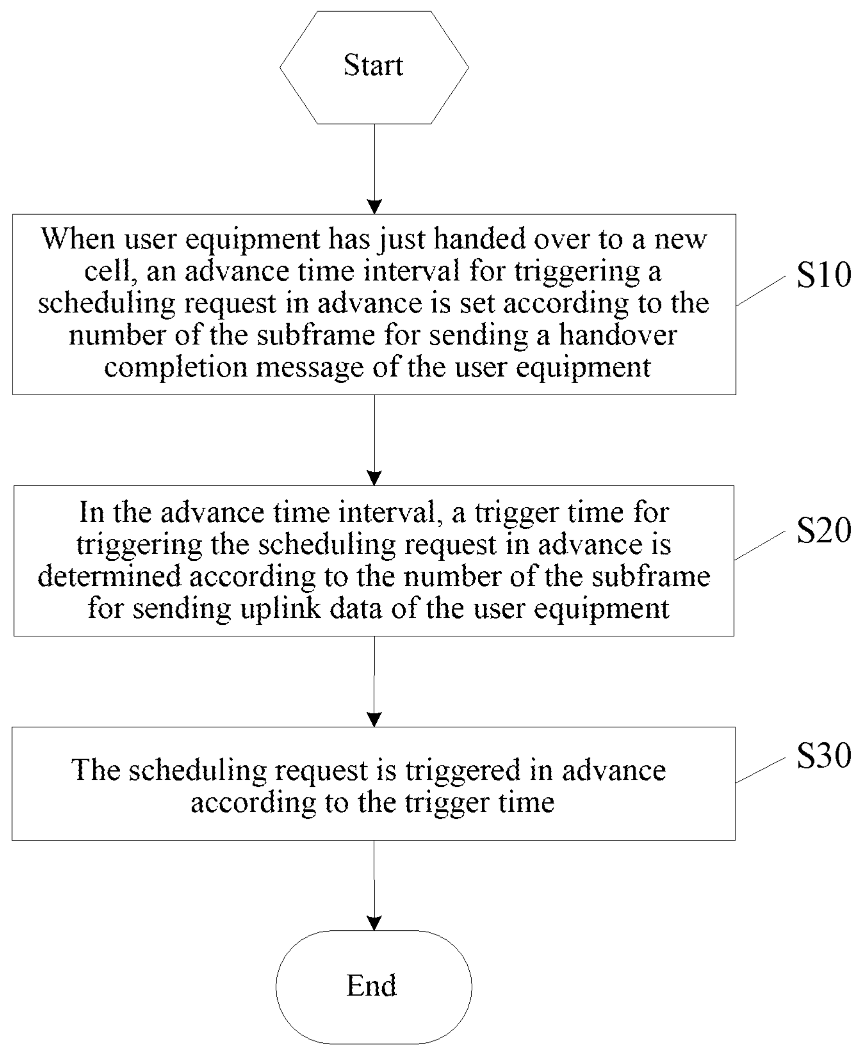
FIG. 1 is a flow chart of a method for processing a scheduling request in a handover scenario in an embodiment of the present document.

Referring to FIG. 1, FIG. 1 is a flow chart of a method for processing a scheduling request in a handover scenario in an embodiment of the present document.

The method for processing a scheduling request in a handover scenario provided by the embodiment of the present document includes the following steps.

In step S10, when user equipment has just handed over to a new cell, an advance time interval for triggering a scheduling request in advance is set according to the number of a subframe for sending a handover completion message of the user equipment.

It is stipulated in the LTE MAC protocol that only in the scenario that the trigger condition of the conventional BSR is satisfied and there is no uplink authorization, the scheduling request could be triggered. There are three kinds of trigger conditions of the conventional BSR: first, the uplink data belonging to a logic channel group with higher priority are arrived; second, there are new data arrived when there are no data used for sending in any logic channel in the logic channel group; third, the retransmission buffer status report timer set by the retransmission BSR timer (retxBSR-Timer) is overtime, and there are data to be sent on the logic channel belonged to one logic channel group at the same.

When the user equipment has just handed over to the new cell, because the interference is relatively large and it is easy to lose the normal uplink scheduling. Under this scenario, triggering the SR in advance before the retransmission buffer status report timer set by the retxBSR-Timer is overtime does benefit to maintain the FTP data connection, does benefit to maintain the FTP data connection. In the present embodiment, when the user equipment has just handed over to the new cell, the advance time interval for triggering the scheduling request in advance is set according to the number of the subframe for sending the handover completion message of the user equipment, and the advance time interval is an execution time for executing triggering the scheduling request in advance before reaching the retransmission buffer status report timer duration, that is, the scheduling request can only be triggered in advance within the time interval, while if it is beyond the range of the time interval, then it need to trigger the scheduling request according to the relevant rule of the retxBSR-Timer overtime.

In step S20, in the advance time interval, a trigger time for triggering the scheduling request in advance is determined according to the number of the subframe for sending uplink data of the user equipment.

After setting the advance time interval for triggering the scheduling request in advance, the number of the subframe for sending the uplink data of the user equipment is used, and the uplink data sent by the user equipment for the first time is the handover completion message, so, the number of the subframe for sending the uplink data for the first time of the user equipment is the number of the subframe for sending the handover completion message of the user equipment. Thereafter, each time the uplink data are sent, the subframe number for sending the uplink data is updated, in order to determine the trigger time for triggering the scheduling request in advance according to the number of the subframe for sending the uplink data, and the determined trigger time is used for indicating the time point of triggering the scheduling request in advance. In the present embodiment, while the subframe number of sending the uplink data is updated, the information of the corresponding buffer status report is updated at the same time.

In step S30, the scheduling request is triggered in advance according to the trigger time.

After determining the trigger time used for indicating to trigger the scheduling request in advance according to the number of the subframe for sending the uplink data of the user equipment, the scheduling request can be triggered in advance according to the trigger time, to request the base station to perform the uplink scheduling to the user equipment.

In the embodiment of the present document, the advance time interval is set for triggering the scheduling request in advance when the user equipment has just handed over to the new cell, and the trigger time for triggering the scheduling request in advance in the advance time interval is determined according to the number of the subframe for sending the uplink data of the user equipment, and finally the scheduling request is triggeded in advance according to the trigger time, thus guaranteeing that the uplink FTP data are sent in time through sending the scheduling request in advance, and avoiding the occurrence of the FTP flow interruption phenomenon.

Figure 2:
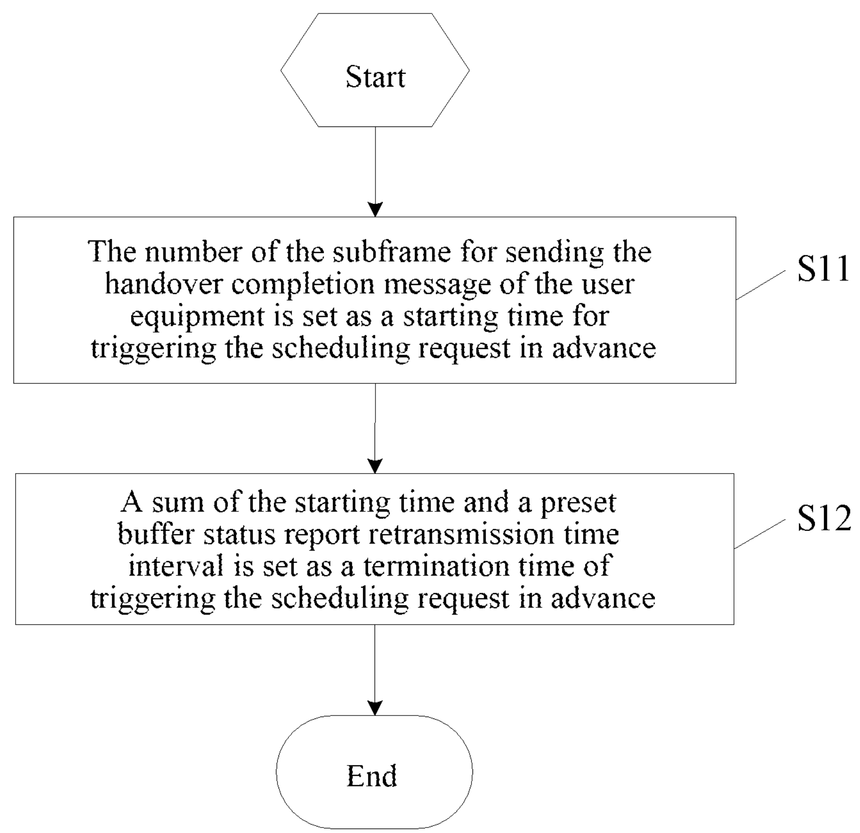
FIG. 2 is a flow chart of setting an advance time interval in a method for processing a scheduling request in a handover scenario in an embodiment of the present document.

Referring to FIG. 2, FIG. 2 is a flow chart of setting an advance time interval in a method for processing a scheduling request in a handover scenario in an embodiment of the present document.

In the above-mentioned embodiment, step S10 includes the following steps.

In step S11, the number of the subframe for sending the handover completion message of the user equipment is set as a starting time for triggering the scheduling request in advance.

When the user equipment has just handed over to the new cell, the uplink data sent for the first time must be the handover completion message. At this moment, the number of the subframe for sending the handover completion message of the user equipment is recorded, and the subframe number is set as the starting time for triggering the scheduling request in advance.

In step S12, a sum of the starting time and a preset retransmission buffer status report timer duration is set as a termination time of triggering the scheduling request in advance, wherein, an interval between the stating time and the termination time is the advance time interval.

In the band FTP service, the retransmission buffer status report timer duration is set by the retxBSR-Timer to prevent the user equipment from frequently triggering the scheduling request. The retransmission buffer status report timer duration is generally minimum 320 ms, and the scheduling request will be triggered when the waiting time exceeds the retransmission buffer status report timer duration. In the present embodiment, the trigger scheduling request needs to be triggered in advance before reaching the retransmission buffer status report timer duration, so, after the starting time is set, the sum of the starting time and the preset retransmission buffer status report timer duration can be set as the termination time of triggering the scheduling request in advance, wherein, the interval between the stating time and the termination time is the advance time interval, and the execution of triggering the scheduling request in advance needs to be completed in the advance time interval.

By setting the number of the subframe for sending the handover completion message of the user equipment as the starting time for triggering the scheduling request in advance, setting the sum of the starting time and the preset retransmission buffer status report timer duration as the termination time of triggering the scheduling request in advance, and taking the interval between the stating time and the termination time as the advance time interval for completing triggering the scheduling request in advance within the advance time interval, it provides the prerequisite assurance for being able to guarantee that the uplink FTP data are sent in time.

Figure 3:
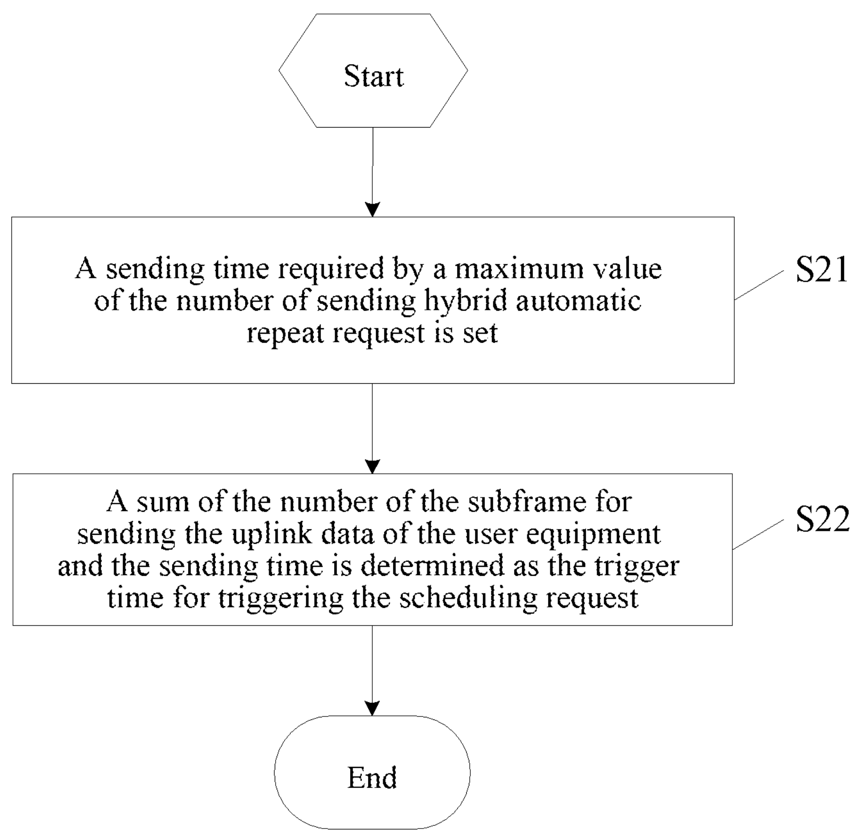
FIG. 3 is a flow chart of determining a trigger time in a method for processing a scheduling request in a handover scenario in an embodiment of the present document.

Referring to FIG. 3, FIG. 3 is a flow chart of determining a trigger time in a method for processing a scheduling request in a handover scenario in an embodiment of the present document.

In the above-mentioned embodiment, step S20 includes the following steps.

In step S21, a sending time required by a maximum value of the number of sending hybrid automatic repeat request is set.

After setting the advance time interval for triggering the scheduling request in advance according to the number of the subframe for sending the handover completion message of the user equipment, within the range of the advance time interval, the maximum value of the number of times of sending the hybrid automatic repeat request is set, and the sending time required when the number of times of sending reaches the maximum value is set.

In step S22, a sum of the number of the subframe for sending the uplink data of the user equipment and the sending time is determined as the trigger time for triggering the scheduling request in advance.

After the user equipment sends the handover completion message completely, it will send the uplink FTP data to the base station, record the number of the current subframe for sending the uplink data when the uplink data are sent every time, and determine the sum of the sending time required when the number of times of sending the hybrid automatic repeat request reaches the maximum value and the number of the subframe for sending the uplink data as the trigger time of triggering the scheduling request in advance. After the trigger time is determined, when the current subframe number is greater than the set trigger time, the further judgment on whether to trigger the scheduling request in advance is just performed.

Within the range of the advance time interval, the sending time required by the maximum value of the number of times of sending the hybrid automatic repeat request is set, and the sum of the number of the subframe for sending the uplink data of the user equipment and the sending time as the trigger time of triggering the scheduling request in advance, thus being able to determine the opportunity for performing triggering the scheduling request in advance.

Figure 4:
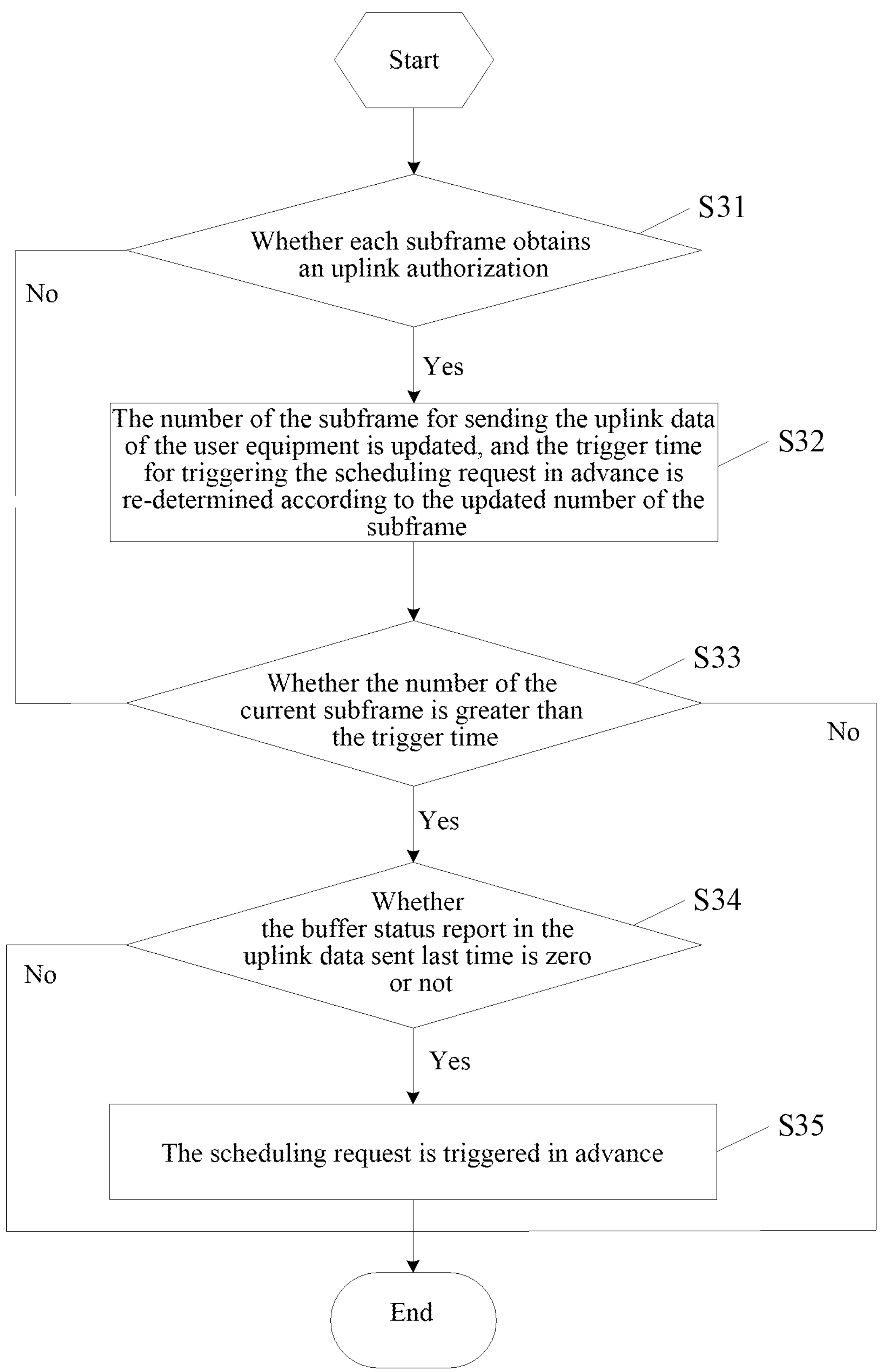
FIG. 4 is a flow chart of triggering a scheduling request in advance in a method for processing a scheduling request in a handover scenario in an embodiment of the present document.

Referring to FIG. 4, FIG. 4 is a flow chart of triggering a scheduling request in advance in a method for processing a scheduling request in a handover scenario in an embodiment of the present document.

In the above-mentioned embodiment, step S30 includes the following steps.

In step S31, after the user equipment sends the uplink data last time, it is judged whether each subframe obtains an uplink authorization; if yes, then step S32 is executed; if not, then step S33 is executed.

In step S32, the number of the subframe for sending the uplink data of the user equipment is updated, and the trigger time for triggering the scheduling request in advance is re-determined according to the updated number of the subframe.

In step S33, it is judged whether the number of the current subframe of the user equipment is greater than the trigger time; if yes, then step S34 is executed.

In step S34, it is judged whether the buffer status report in the uplink data sent last time is zero or not; if not, then step S35 is executed.

In step S35, the scheduling request is triggered in advance.

After the user equipment sends the uplink data last time, it is judged whether the current subframe of the user equipment obtains the uplink authorization at first; if the uplink authorization is obtained, then the number of the subframe for sending the uplink data of the user equipment is updated, and the trigger time for triggering the scheduling request in advance is re-determined according to the updated number of the subframe.

When the user equipment does not obtain the uplink authorization in the current subframe, it is further judged whether the number of the current subframe is greater than the trigger time; if yes, then it is judged whether the buffer status report in the uplink data sent last time is zero or not; and when the buffer status report in the uplink data sent last time is zero, then it is indicated that the user equipment needs to send the FTP data to the base station, and there are the uplink FTP data that the user equipment needs to send to the base station in the high-layer buffer. So, when it is judged that the buffer status report in the uplink data sent last time is not zero, then the scheduling request is triggered in advance.

When the user equipment prepares to send the uplink data, it is judged whether the current subframe obtains the uplink authorization at first; if the uplink authorization is obtained, then the number of the subframe for sending the uplink data of the user equipment is updated, and the trigger time for triggering the scheduling request in advance is re-determined according to the updated number of the subframe. While when there is no uplink authorization, it is further judged whether the number of the current subframe is greater than the trigger time; if yes, then it is judged whether the buffer status report in the uplink data sent last time is zero or not; and the scheduling request is triggered in advance when it is judged that the buffer status report in the uplink data sent last time is not zero. In this way, it is realized to trigger the scheduling request in advance, thus further guaranteeing the sending of the uplink FTP data and further avoiding the occurrence of the FTP flow interruption.

Figure 5:
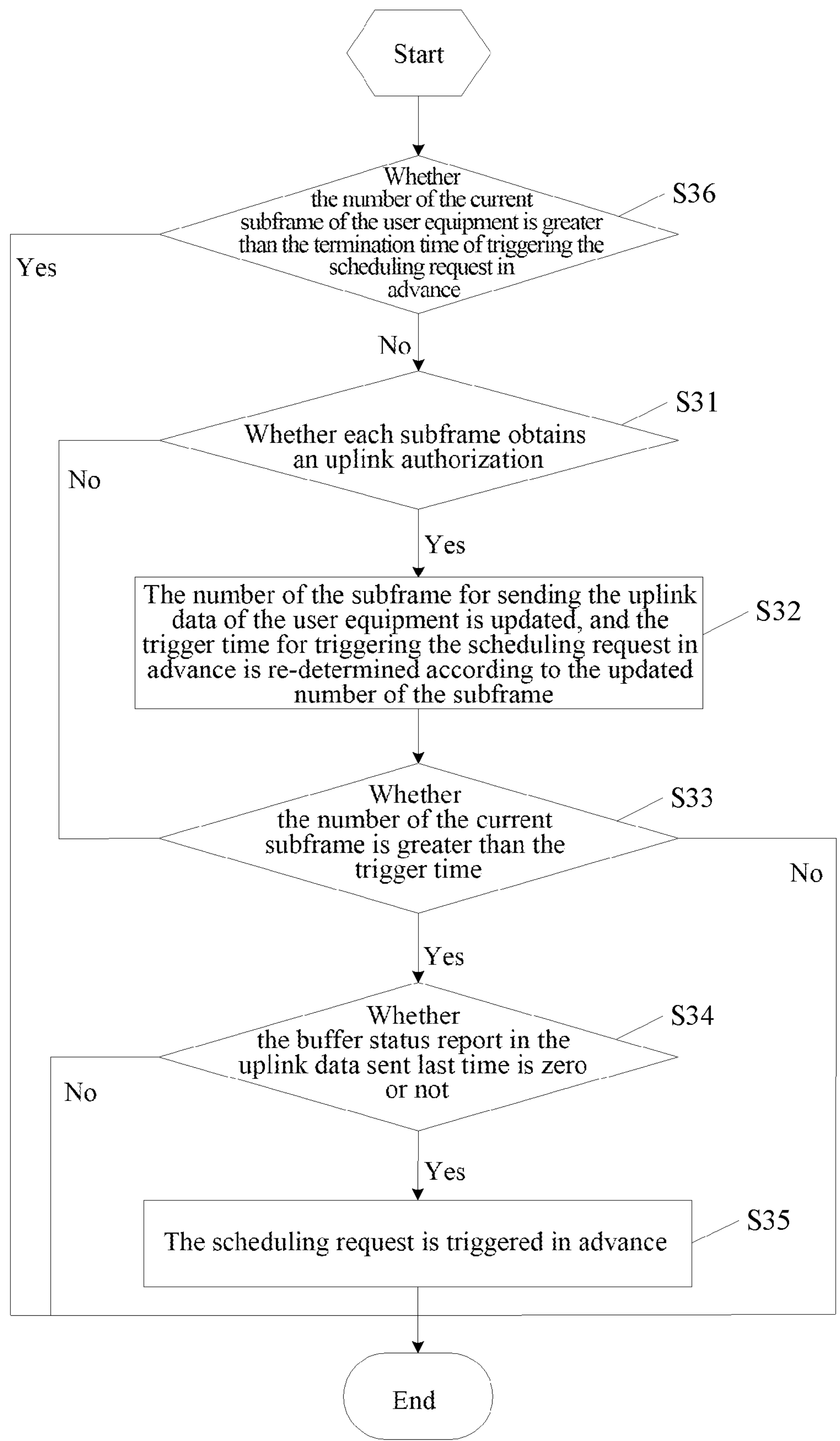
FIG. 5 is a flow chart of a method for processing a scheduling request in a handover scenario in another embodiment of the present document.

Referring to FIG. 5, FIG. 5 is a flow chart of a method for processing a scheduling request in a handover scenario in another embodiment of the present document.

Based on the above-mentioned embodiment, before executing the step S31, the method further includes the following step.

In step S36, it is judged whether the number of the current subframe of the user equipment is greater than the termination time of triggering the scheduling request in advance.

When the user equipment prepares to send the uplink data, it is judged whether the number of the current subframe of the user equipment is greater than the termination time of triggering the scheduling request in advance. Because the execution of triggering the scheduling request in advance needs to be within the range of the advance time interval, if it is determined that the number of the current subframe of sending the uplink data is greater than the termination time of triggering the scheduling request in advance, that is to say, it is beyond the range of the advance time interval, the scheduling request is not required to be triggered in advance at this moment, while the scheduling request is only required to be triggered according to the relevant rule of the retxBSR-Timer overtime; and if it is judged the number of the current subframe is less than or equal to the termination time of triggering the scheduling request in advance, the judgment whether the number of the current subframe is greater than the trigger time is performed.

Through judging whether the number of the current subframe of the user equipment is greater than the termination time of triggering the scheduling request in advance and performing the further judgment only when the number of the current subframe is less than or equal to the termination time of triggering the scheduling request in advance, thus it is further convenient to determine the opportunity of trigging the scheduling request in advance.

The present document further provides an apparatus for processing a scheduling request in a handover scenario.

Figure 6:
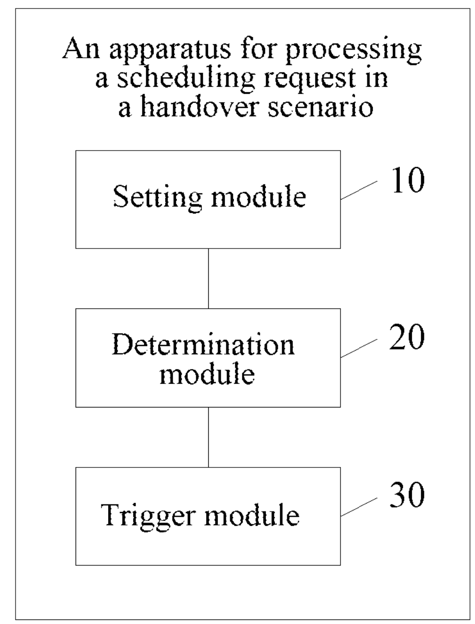
FIG. 6 is a structure diagram of an apparatus for processing a scheduling request in a handover scenario in an embodiment of the present document.

Referring to FIG. 6, FIG. 6 is a structure diagram of an apparatus for processing a scheduling request in a handover scenario in an embodiment of the present document.

The apparatus for processing a scheduling request in a handover scenario provided in the embodiment of the present document includes a setting module 10, a determination module 20 and a trigger module 30, wherein:

the setting module 10 is configured to: when user equipment has just handed over to a new cell, set an advance time interval for triggering a scheduling request in advance according to a number of the subframe for sending a handover completion message of the user equipment;

the determination module 20 is configured to: in the advance time interval, determine a trigger time for triggering the scheduling request in advance according to the number of the subframe for sending uplink data of the user equipment; and the trigger module 30 is configured to: trigger the scheduling request in advance according to the trigger time.

It is stipulated in the LTE MAC protocol that only in the scenario that the trigger condition of the conventional BSR is satisfied and there is no uplink authorization, the scheduling request could be triggered. There are three kinds of trigger conditions of the conventional BSR: first, the uplink data belonging to a logic channel group with higher priority are arrived; second, there are new data arrived when there are no data used for sending in any logic channel in the logic channel group; third, the retransmission buffer status report timer set by the retransmission BSR timer (retxBSR-Timer) is overtime, and there are data to be sent on the logic channel belonged to one logic channel group at the same.

When the user equipment has just handed over to the new cell, because the interference is relatively large and it is easy to lose the normal uplink scheduling. Under this scenario, triggering the SR in advance before the retransmission buffer status report timer set by the retxBSR-Timer is overtime does benefit to maintain the FTP data connection, does benefit to maintain the FTP data connection. In the present embodiment, when the user equipment has just handed over to the new cell, the advance time interval for triggering the setting module 10 sets the scheduling request in advance according to the number of the subframe for sending the handover completion message of the user equipment, and the advance time interval is an execution time for executing triggering the scheduling request in advance before reaching the retransmission buffer status report timer duration, that is, the scheduling request can only be triggered in advance within the time interval, while if it is beyond the range of the time interval, then it need to trigger the scheduling request according to the relevant rule of the retxBSR-Timer overtime.

After setting the advance time interval for triggering the scheduling request in advance, the number of the subframe for sending the uplink data of the user equipment is used, and the uplink data sent by the user equipment for the first time is the handover completion message, so, the number of the subframe for sending the uplink data for the first time of the user equipment is the number of the subframe for sending the handover completion message of the user equipment. Thereafter, each time the uplink data are sent, the subframe number for sending the uplink data is updated, so that the determination module 20 determines the trigger time for triggering the scheduling request in advance according to the number of the subframe for sending the uplink data, and the determined trigger time is used for indicating the time point of triggering the scheduling request in advance. In the present embodiment, while the number of the subframe for sending the uplink data is updated, the information of the corresponding buffer status report is updated at the same time.

After determining the trigger time used for indicating to trigger the scheduling request in advance according to the number of the subframe for sending the uplink data of the user equipment, the trigger module can trigger the scheduling request in advance according to the trigger time, to request the base station to perform the uplink scheduling to the user equipment.

In the embodiment of the present document, the advance time interval is set for triggering the scheduling request in advance when the user equipment has just handed over to the new cell, and the trigger time for triggering the scheduling request in advance in the advance time interval is determined according to the number of the subframe for sending the uplink data of the user equipment, and finally the scheduling request is triggeded in advance according to the trigger time, thus guaranteeing that the uplink FTP data are sent in time through sending the scheduling request in advance, and avoiding the occurrence of the FTP flow interruption phenomenon.

Figure 7:
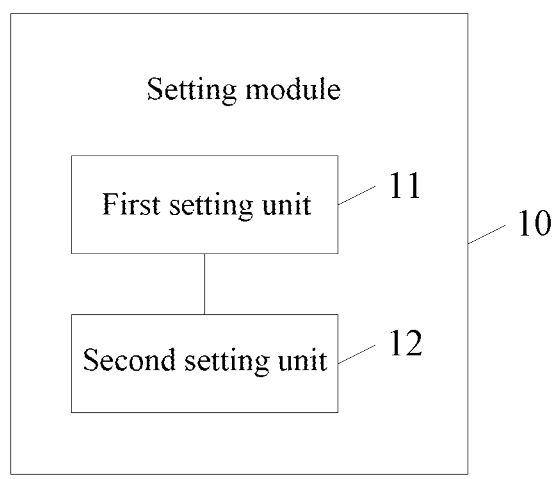
FIG. 7 is a structure diagram of a setting module in an apparatus for processing a scheduling request in a handover scenario in an embodiment of the present document.

Referring to FIG. 7, FIG. 7 is a structure diagram of a setting module in an apparatus for processing a scheduling request in a handover scenario in an embodiment of the present document.

In the above-mentioned embodiment, the setting module 10 includes a first setting unit 11 and a second setting unit 12, wherein, the first setting unit 11 is configured to: set the number of the subframe for sending the handover completion message of the user equipment as a starting time for triggering the scheduling request in advance; and the second setting unit 12 is configured to: set a sum of the starting time and a preset retransmission buffer status report timer duration as a termination time of triggering the scheduling request in advance, wherein, an interval between the stating time and the termination time is the advance time interval.

When the user equipment has just handed over to the new cell, the uplink data sent for the first time must be the handover completion message; at this moment, the number of the subframe for sending the handover completion message of the user equipment is recorded, and the number of the subframe is set as the starting time for triggering the scheduling request in advance through the first setting unit 11.

In the band FTP service, the retransmission buffer status report timer duration is set by the retxBSR-Timer to prevent the user equipment from frequently triggering the scheduling request. The retransmission buffer status report timer duration is generally minimum 320 ms, and the scheduling request will be triggered when the waiting time exceeds the retransmission buffer status report timer duration. In the present embodiment, the trigger scheduling request needs to be triggered in advance before reaching the retransmission buffer status report timer duration, so, after the starting time is set, the second setting unit 12 can just set the sum of the starting time and the preset retransmission buffer status report timer duration as the termination time of triggering the scheduling request in advance, wherein, the interval between the stating time and the termination time is the advance time interval, and the execution of triggering the scheduling request in advance needs to be completed in the advance time interval.

number of the subframe The number of the subframe for sending the handover completion message of the user equipment is set as the starting time for triggering the scheduling request in advance, and the sum of the starting time and the preset retransmission buffer status report timer duration is set as the termination time of triggering the scheduling request in advance, wherein, the interval between the stating time and the termination time is the advance time interval, for completing triggering the scheduling request in advance within the advance time interval, thus providing the prerequisite assurance for being able to guarantee that the uplink FTP data are sent in time.

Figure 8:
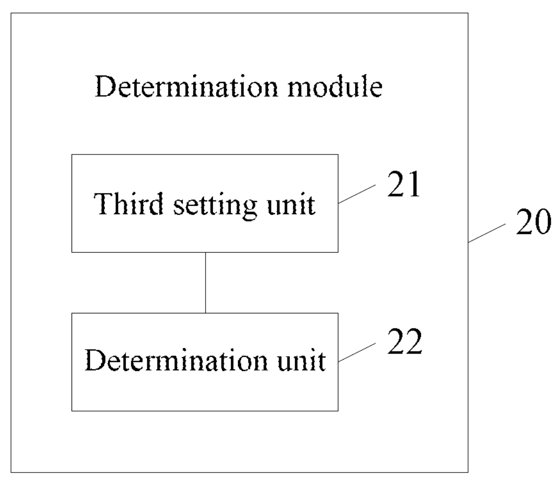
FIG. 8 is a structure diagram of a determination module in an apparatus for processing a scheduling request in a handover scenario in an embodiment of the present document.

Referring to FIG. 8, FIG. 8 is a structure diagram of a determination module in an apparatus for processing a scheduling request in a handover scenario in an embodiment of the present document.

In the above-mentioned embodiment, the determination module 20 includes a third setting unit 21 and a determination unit 22, wherein:

the third setting unit 21 is configured to: set a sending time required by a maximum value of a number of times of sending hybrid automatic repeat request; and the determination unit 22 is configured to: determine a sum of the number of the subframe for sending the uplink data of the user equipment and the sending time as the trigger time for triggering the scheduling request.

After setting the advance time interval for triggering the scheduling request in advance according to the number of the subframe for sending the handover completion message of the user equipment, within the range of the advance time interval, the maximum value of the number of sending the hybrid automatic repeat request is set through the third setting unit 21, and the sending time required when the number of times of sending reaches the maximum value is set.

After the user equipment sends the handover completion message completely, it will send the uplink FTP data to the base station, and record the current number of the subframe which sends the uplink data when the uplink data are sent every time, and the determination unit 22 determines the sum of the sending time required when the number of times of sending the hybrid automatic repeat request reaches the maximum value and the number of the subframe for sending the uplink data as the trigger time of triggering the scheduling request in advance. After the trigger time is determined, when the number of the current subframe is greater than the set trigger time, the further judgment on whether to trigger the scheduling request in advance is just performed.

Within the range of the advance time interval, the sending time required by the maximum value of the number of times of sending the hybrid automatic repeat request is set, and the sum of the number of the subframe for sending the uplink data of the user equipment and the sending time as the trigger time of triggering the scheduling request in advance, thus being able to determine the opportunity for performing triggering the scheduling request in advance.

Figure 9:
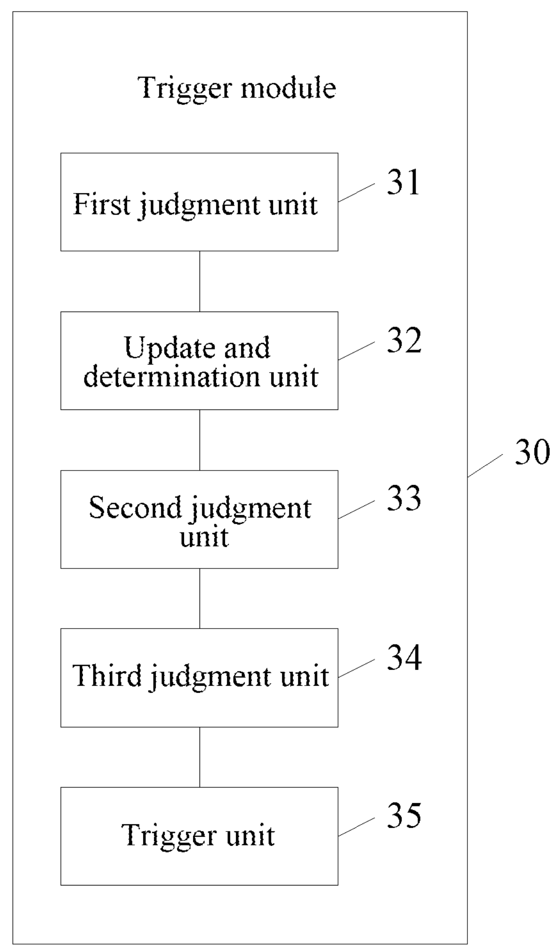
FIG. 9 is a structure diagram of a trigger module in an apparatus for processing a scheduling request in a handover scenario in an embodiment of the present document.

Referring to FIG. 9, FIG. 9 is a structure diagram of a trigger module in an apparatus for processing a scheduling request in a handover scenario in an embodiment of the present document.

In the above-mentioned embodiment, the trigger module 30 includes a first judgment unit 31, an update and determination unit 32, a second judgment unit 33, a third judgment unit 34 and a trigger unit 35, wherein:

the first judgment unit 31 is configured to: after the user equipment sends the uplink data last time, judge whether each subframe obtains an uplink authorization;

the update and determination unit 32 is configured to: update the number of the subframe for sending the uplink data of the user equipment, and re-determine the trigger time for triggering the scheduling request in advance according to the updated number of the subframe;

the second judgment unit 33 is configured to: judge whether the number of the current subframe of the user equipment is greater than the trigger time;

the third judgment unit 34 is configured to: judge whether the buffer status report in the uplink data sent last time is zero or not; and the trigger unit 35 is configured to: when the buffer status report in the uplink data sent last time is not zero, trigger the scheduling request in advance.

After the user equipment sends the uplink data last time, the first judgment unit 31 judges whether the current subframe of the user equipment obtains the uplink authorization at first; if the uplink authorization is obtained, then the update and determination unit 32 updates the number of the subframe for sending the uplink data of the user equipment, and re-determines the trigger time for triggering the scheduling request in advance according to the updated number of the subframe.

When the user equipment does not obtain the uplink authorization in the current number of the subframe, the second judgment unit 33 further judges whether the current number of the subframe is greater than the trigger time; if yes, then the third judgment unit 34 judges whether the buffer status report in the uplink data sent last time is zero or not; and when the buffer status report in the uplink data sent last time is zero, then it is indicated that the user equipment needs to send the FTP data to the base station, and there are the uplink FTP data that the user equipment needs to send to the base station in the high-layer buffer. So, when it is judged that the buffer status report in the uplink data sent last time is not zero, then the trigger unit 35 triggers the scheduling request in advance.

When the user equipment prepares to send the uplink data, it is judged whether the current subframe obtains the uplink authorization at first; if the uplink authorization is obtained, then the number of the subframe for sending the uplink data of the user equipment is updated, and the trigger time for triggering the scheduling request in advance is re-determined according to the updated number of the subframe. While when there is no uplink authorization, it is further judged whether the current number of the subframe is greater than the trigger time; if yes, then it is judged whether the buffer status report in the uplink data sent last time is zero or not; and the scheduling request is triggered in advance when it is judged that the buffer status report in the uplink data sent last time is not zero. In this way, it is realized to trigger the scheduling request in advance, thus further guaranteeing the sending of the uplink FTP data and further avoiding the occurrence of the FTP flow interruption.

Figure 10:
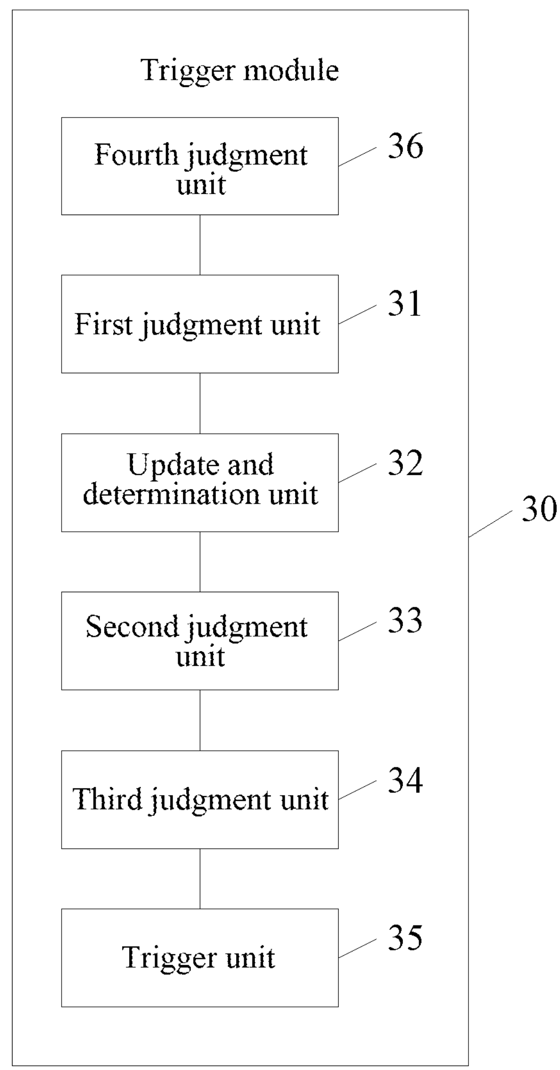
FIG. 10 is a structure diagram of an apparatus for processing a scheduling request in a handover scenario in another embodiment of the present document.

Referring to FIG. 10, FIG. 10 is a structure diagram of an apparatus for processing a scheduling request in a handover scenario in another embodiment of the present document.

Based on the above-mentioned embodiment, the trigger module 30 further includes a fourth judgment unit 36, wherein:

the fourth judgment unit 36 is configured to: judge whether the number of the current subframe of the user equipment is greater than the termination time of triggering the scheduling request in advance.

When the user equipment prepares to send the uplink data, the fourth judgment unit 36 judges whether the number of the current subframe of the user equipment is greater than the termination time of triggering the scheduling request in advance. Because the execution of triggering the scheduling request in advance needs to be within the range of the advance time interval, if it is determined that the number of the current subframe of sending the uplink data is greater than the termination time of triggering the scheduling request in advance, that is to say, it is beyond the range of the advance time interval, the scheduling request is not required to be triggered in advance at this moment, while the scheduling request is only required to be triggered according to the relevant rule of the retxBSR-Timer overtime; and if it is judged the number of the current subframe is less than or equal to the termination time of triggering the scheduling request in advance, the judgment whether the number of the current subframe is greater than the trigger time is performed.

Through judging whether the number of the current subframe of the user equipment is greater than the termination time of triggering the scheduling request in advance and performing the further judgment only when the number of the current subframe is less than or equal to the termination time of triggering the scheduling request in advance, thus it is further convenient to determine the opportunity of trigging the scheduling request in advance.

The above description is only the preferable embodiments of the present document and is not intended to limit the patent scope of the present document. All conversions of equivalents structures and equivalents procedures made by using the description and accompanying drawings of the present document, or direct or indirect using in other related technical field, should be embodied in the scope of the appending claims of the present document.

INDUSTRIAL APPLICABILITY

In the above-mentioned technical solution, the advance time interval is set for triggering the scheduling request in advance when the user equipment has just handed over to the new cell, and the trigger time for triggering the scheduling request in advance in the advance time interval is determined according to the number of the subframe for sending the uplink data of the user equipment, and finally the scheduling request is triggeded in advance according to the trigger time, thus guaranteeing that the uplink FTP data are sent in time through sending the scheduling request in advance, and avoiding the occurrence of the FTP flow interruption phenomenon. Therefore, the present document has a very strong industrial applicability.

I claim:

1. A method for processing a scheduling request in a handover scenario, comprising:

when user equipment has just handed over to a new cell, setting an advance time interval for triggering a scheduling request in advance according to a number of a subframe for sending a handover completion message of the user equipment;

in the advance time interval, determining a trigger time for triggering the scheduling request in advance according to the number of the subframe for sending uplink data of the user equipment; and triggering the scheduling request in advance according to the trigger time.

2. The method for processing a scheduling request in a handover scenario according to claim 1, wherein, the step of setting an advance time interval for triggering a scheduling request in advance according to a number of a subframe for sending a handover completion message of the user equipment comprises:

setting the number of the subframe for sending the handover completion message of the user equipment as a starting time for triggering the scheduling request in advance; and setting a sum of the starting time and a preset retransmission buffer status report timer duration as a termination time of triggering the scheduling request in advance, wherein, an interval between the stating time and the termination time is the advance time interval.

3. The method for processing a scheduling request in a handover scenario according to claim 2, wherein, the step of determining a trigger time for triggering the scheduling request in advance according to the number of the subframe for sending uplink data of the user equipment comprises:

setting a sending time required by a maximum value of a number of times of sending hybrid automatic repeat request; and determining a sum of the number of the subframe for sending the uplink data of the user equipment and the sending time as the trigger time for triggering the scheduling request.

4. The method for processing a scheduling request in a handover scenario according to claim 3, wherein, the step of triggering the scheduling request in advance according to the trigger time comprises:

after the user equipment sends the uplink data last time, judging whether each subframe obtains an uplink authorization; if yes, then updating the number of the subframe for sending the uplink data of the user equipment, and re-determining the trigger time for triggering the scheduling request in advance according to the updated number of the subframe;

if not, judging whether a number of a current subframe of the user equipment is greater than the trigger time; if yes, then judging whether the buffer status report in the uplink data sent last time is zero or not; and when the buffer status report in the uplink data sent last time is not zero, triggering the scheduling request in advance.

5. The method for processing a scheduling request in a handover scenario according to claim 4, before judging whether the number of the current subframe of the user equipment is greater than the trigger time, further comprising:

judging whether the number of the current subframe of the user equipment is greater than the termination time of triggering the scheduling request in advance.

6. An apparatus for processing a scheduling request in a handover scenario, comprising a setting module, a determination module and a trigger module, wherein:

the setting module is configured to: when user equipment has just handed over to a new cell, set an advance time interval for triggering a scheduling request in advance according to a number of a subframe for sending a handover completion message of the user equipment;

the determination module is configured to: in the advance time interval, determine a trigger time for triggering the scheduling request in advance according to the number of the subframe for sending uplink data of the user equipment; and the trigger module is configured to: trigger the scheduling request in advance according to the trigger time.

7. The apparatus for processing a scheduling request in a handover scenario according to claim 6, wherein, the setting module comprises a first setting unit and a second setting unit, wherein:

the first setting unit is configured to: set the number of the subframe for sending the handover completion message of the user equipment as a starting time for triggering the scheduling request in advance; and the second setting unit is configured to: set a sum of the starting time and a preset retransmission buffer status report timer duration as a termination time of triggering the scheduling request in advance, wherein, an interval between the stating time and the termination time is the advance time interval.

8. The apparatus for processing a scheduling request in a handover scenario according to claim 7, wherein, the determination module comprises a third setting unit and a determination unit, wherein:

the third setting unit is configured to: set a sending time required by a maximum value of a number of times of sending hybrid automatic repeat request; and the determination unit is configured to: determine a sum of the number of the subframe for sending the uplink data of the user equipment and the sending time as the trigger time for triggering the scheduling request.

9. The apparatus for processing a scheduling request in a handover scenario according to claim 8, wherein, the trigger module comprises a first judgment unit, an update and determination unit, a second judgment unit, a third judgment unit and a trigger unit, wherein:

the first judgment unit is configured to: after the user equipment sends the uplink data last time, judge whether each subframe obtains an uplink authorization;

the update and determination unit is configured to: update the number of the subframe for sending the uplink data of the user equipment, and re-determine the trigger time for triggering the scheduling request in advance according to the updated number of the subframe;

the second judgment unit is configured to: judge whether a number of a current subframe of the user equipment is greater than the trigger time;

the third judgment unit is configured to: judge whether the buffer status report in the uplink data sent last time is zero or not; and the trigger unit is configured to: when the buffer status report in the uplink data sent last time is not zero, trigger the scheduling request in advance.

10. The apparatus for processing a scheduling request in a handover scenario according to claim 9, wherein, the trigger module further comprises a fourth judgment unit, wherein:

the fourth judgment unit is configured to: judge whether the number of the current subframe of the user equipment is greater than the termination time of triggering the scheduling request in advance.

* * * * *